United States Patent [19]

Kishi

[11] Patent Number: 5,144,318
[45] Date of Patent: Sep. 1, 1992

[54] APPARATUS AND METHOD FOR NAVIGATING VEHICLE USING GPS

[75] Inventor: Hisao Kishi, Kanagawa, Japan
[73] Assignee: Nissan Motor Company, Ltd., Japan
[21] Appl. No.: 738,505
[22] Filed: Aug. 1, 1991

Related U.S. Application Data

[63] Continuation-in-part of Ser. No. 468,723, Jan. 24, 1990, abandoned.

[30] Foreign Application Priority Data

Jan. 26, 1989 [JP] Japan .................................... 1-15080

[51] Int. Cl.⁵ ............................. H04B 7/85; G01S 5/02
[52] U.S. Cl. .................................................... 342/357
[58] Field of Search ................... 342/352, 357, 356; 318/649; 343/713

[56] References Cited

U.S. PATENT DOCUMENTS 4,731,613 3/1988 Endo et al. .......................... 342/357
4,743,913 5/1988 Takai ................................... 342/457

OTHER PUBLICATIONS

Lindenmeier et al "Preiswert und reaktionsschnell", Funkschau, 26, (1986), pp. 42-45.
Lindenmeier et al, "Leistungsfahigkeit von Mehrantennen-Diversity for den UKW-Rundfunk im Auto", Rundfunktechnische Mitteilungen, No. 5 (1987) pp. 221-228.

Primary Examiner—Theodore M. Blum
Attorney, Agent, or Firm—Lowe, Price, LeBlanc & Becker

[57] ABSTRACT

An apparatus and method for navigating a vehicle using GPS (Global Positioning System) are disclosed in which a plurality of GPS antennae are installed on a plurality of positions, e.g., front and rear ends or left and right sides of the vehicle. A direction sensor for detecting a forward direction of the vehicle is installed. Also, a satellite arrangement calculating block for determining satellites from which electromagnetic waves can be received through the respective antennae on the basis of; orbit data on the satellites, the mounting arrangement of the GPS antennae, and the forward direction of the vehicle is included. A receive satellite selecting block for selecting the satellites required to calculate position from among the available satellites from which each GPS antennae can receive electromagnetic waves is installed, so that the receive satellites is previously determined, differently from a diversity method, so speedy and accurate measurement of the present position of the vehicle can be made.

15 Claims, 4 Drawing Sheets

APPARATUS AND METHOD FOR NAVIGATING VEHICLE USING GPS

CROSS REFERENCE

This is a continuation-in-part application of a U.S. patent application Ser. No. 468,723 filed on Jan. 24, 1990, now abandoned.

BACKGROUND OF THE INVENTION (1) Field of the Invention

The present invention relates generally to an apparatus and method for navigating a vehicle using GPS.

(2) Description of the Background Art

Recently, various types of route guiding systems for vehicles have been proposed with which to correct accumulated movement errors relative to a starting point using a gyroscope, a GPS (Global Positioning System) is utilized.

One of various types of GPS navigation systems has been proposed in which a single GPS antenna is installed on a roof top of a vehicle body and the present position of the vehicle is calculated on the basis of electromagnetic waves derived from a plurality of satellites by the GPS antenna.

For accurate GPS positioning three satellites are required for two dimensional positional calculation and four are needed for three-dimensional positional calculation. The reason that the antenna is installed to pick up electromagnetic waves as far away as possible with a wide field of view.

In addition, a plurality of GPS antennae may be installed on different positions of the vehicle and a diversity method adopted in which the present position of the vehicle is calculated on the basis of electromagnetic input from the antennae having the highest reception sensitivity.

However, since, in the system described above, the GPS antennae are installed on the roof top of the vehicle, major modification to the vehicle body is required in order to counter water leakage and provide a sufficiently rigid roof structure. Consequently, a specialized vehicle body structure is required and the cost of implementing the GPS navigating system becomes high.

Additionally, in the diversity method described above, antennae having high reception sensitivities are used, and measurement of position on the basis of actual reception results is carried out. In many cases, a long time may be required to receive electromagnetic waves from the satellites and calculate the present position of the vehicle and a great number of opportunities for measuring position may not occur due to an insufficient number of satellites. Therefore, lack of practicability becomes a drawback.

SUMMARY OF THE INVENTION

It is an object of the present invention to provide a vehicular GPS navigating apparatus and method for vehicles, using a plurality of GPS antennae installed on a preferable position other than the vehicular roof top and which can accurately and speedily measure the position of the vehicle.

The above-described object can be achieved by providing a GPS (Global Positioning System) navigating apparatus for a vehicle object, comprising: a) a plurality of GPS antennae installed at positions other than the roof top of the movable object in which the GPS navigating apparatus is mounted; b) first means for deriving a forward direction of the movable object; c) second means for selecting any of a plurality of satellites from which each GPS antenna can receive electromagnetic waves on the basis of orbit data of the respective satellites, mounting positions of the GPS antennae, and forward direction of the movable object; and d) third means for selecting any of the satellites required to calculate a present position of the movable object from among the satellites from which the GPS antennae can receive the electromagnetic waves.

The above-described object can also be achieved by providing a vehicular GPS navigating apparatus comprising: a) a plurality of GPS antennae installed at positions other than the roof top of the movable object in which the GPS navigating apparatus is mounted; b) first means for deriving a forward direction of the movable object; c) second means for selecting any of a plurality of satellites from which each GPS antenna can receive electromagnetic waves on the basis of orbit data of the respective satellites, mounting positions of the GPS antennae, and forward direction of the movable object; and d) third means for selecting any of the satellites required to calculate a present position of the movable object from among the satellites from which the GPS antennae can receive the electromagnetic waves.

The above-described object can also be achieved by providing a method of navigating a vehicle using GPS (Global Positioning System), comprising the steps of: a) providing a plurality of GPS antennae installed at positions other than the roof top of the movable object in which the GPS navigating apparatus is mounted; b) deriving a forward direction of the vehicle; c) selecting any of a plurality of satellites from which each GPS antenna can receive electromagnetic waves on the basis of orbit data of the respective satellites, mounting positions of the GPS antenna, and forward direction of the vehicle; and d) selecting the satellites required to calculate a present position of the vehicle from among the satellites from which the GPS antennae can receive electromagnetic waves.

DETAILED DESCRIPTION OF THE PREFERRED EMBODIMENTS

Reference will, hereinafter, be made to the drawings in order to facilitate a better understanding of the present invention.

Figure 1:
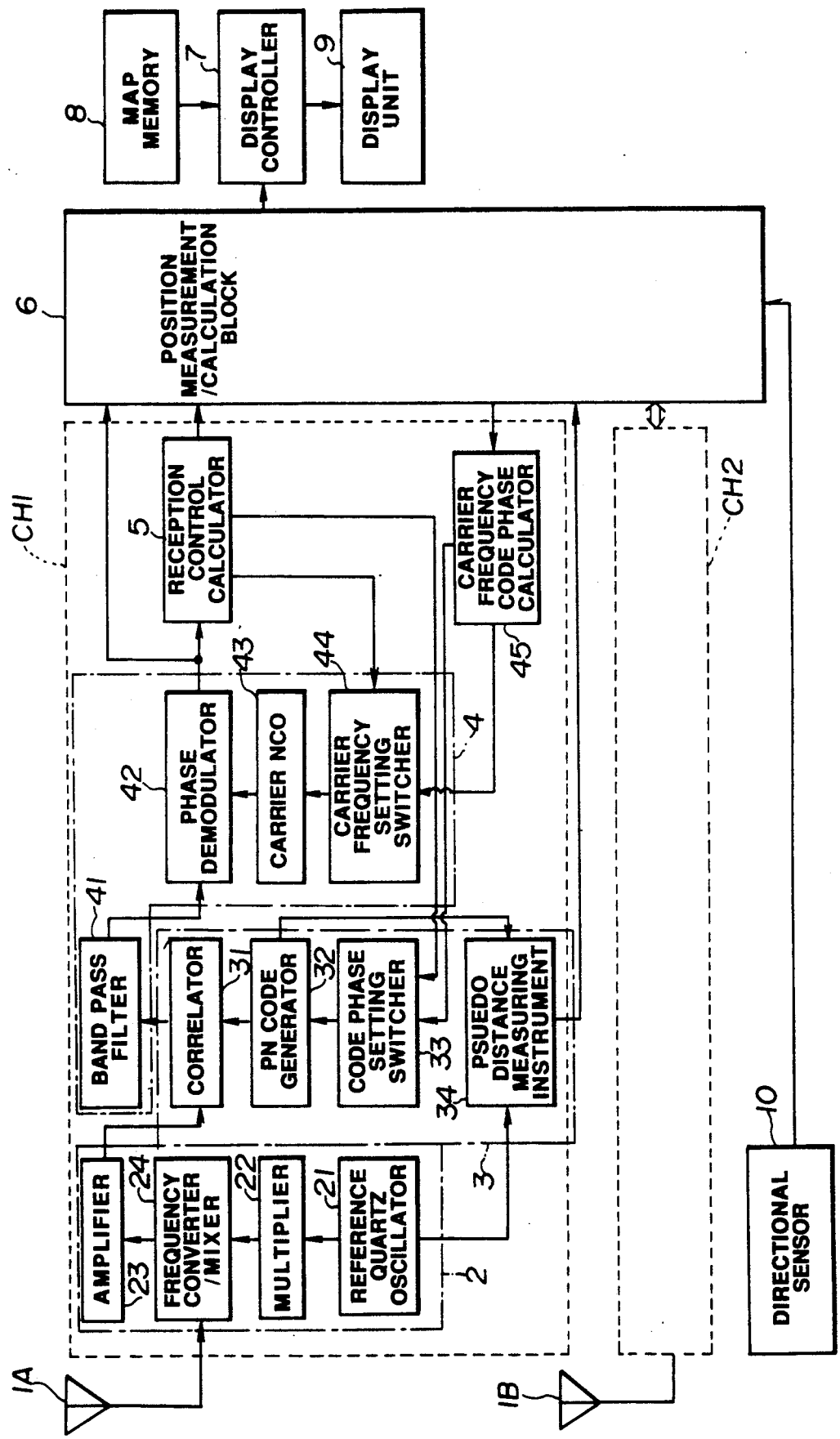
FIG. 1 is a circuit block diagram of a GPS navigating apparatus applicable to a vehicle in a preferred embodiment according to the present invention.

FIG. 1 shows a circuit block diagram of a GPS (Global Positioning System) navigating apparatus in a preferred embodiment according to the present invention.

The GPS navigating apparatus in the preferred embodiment includes two channels CH1 and CH2. Electromagnetic waves from a plurality of GPS satellites trapped by the respective channels are used to measure the position of the GPS apparatus, i.e., an absolute position of the vehicle in which the GPS navigating apparatus is mounted.

In FIG. 1, 1A denotes a first GPS antenna installed on a part of a vehicle body except a roof top portion of the vehicle body as will be described later and 1B denotes a second GPS antenna installed on another portion of the vehicle body as will be described later.

FIGS. 2 through 5 show positioning examples for the first and second GPS antennae 1A and 1B.

Figure 2:
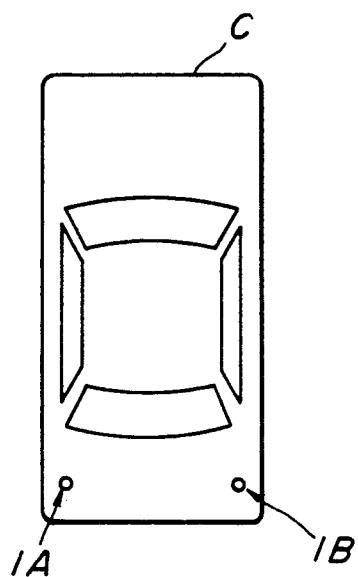
FIGS. 2 through 5 are plan views showing an example of a mounted pair of GPS antennae on a vehicle.
Figure 3:
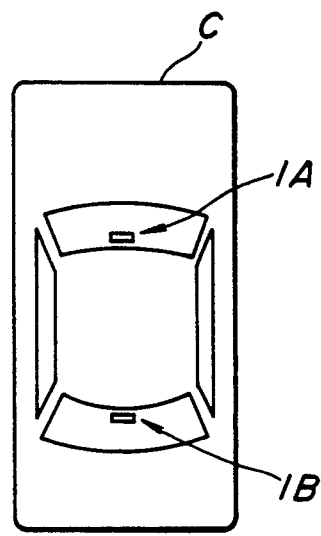
Figure 4:
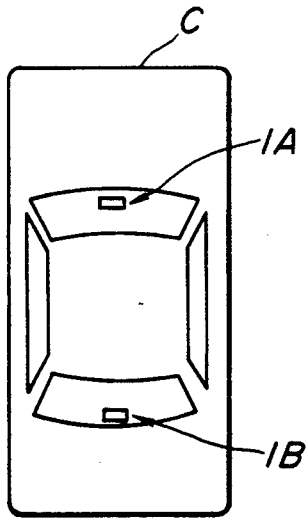

In FIG. 2, the first and second GPS antennae are installed on both sides of a trunk lid of the vehicle body C. In FIG. 3, the first and second GPS antennae 1A, 1B are installed respectively on inner sides of a front windshield and rear windshield of the vehicle body C. In FIG. 4, the first and second GPS antennae are installed on upper surfaces of an instrument panel and rear parcel shelf of the vehicle body C.

Figure 5:
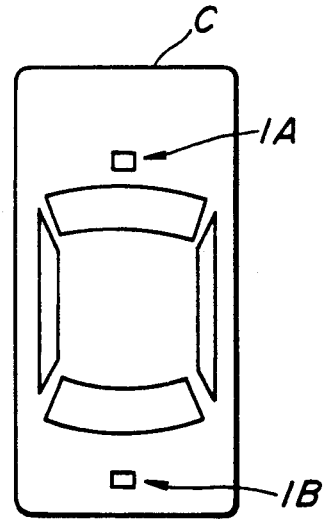

In FIG. 5, the antennae 1A, 1B are installed on a bonnet and trunk lid of the vehicle body C.

Referring again to FIG. 1, each channel CH1 and CH2 includes a frequency converter 2 having a reference quartz oscillator 21, multiplier 22, amplifier 23, and a mixer 24 included in the frequency converter 2. The frequency converter 2 serves to convert the received signal from the first or second antenna 1A or 1B into a frequency converted signal with reference to a multiplied signal of the multiplier 22 (the reference quartz oscillator 21 generates a reference frequency signal which is to be multiplied by the multiplier 22).

Furthermore, each channel CH1 and CH2 includes a pseudo distance measuring circuit 3 having a collator 31, PN (Pseudo Noise) code generator 32, code phase setting switcher 33, and pseudo distance measuring instrument 34. The pseudo distance measuring circuit 3 takes a correlation between a PN code of the frequency converted signal derived from the frequency converter 2 and internally generated PN code and carries out a PN demodulation.

Furthermore, each channel CH1 and CH2 includes an orbit data demodulator 4 having a band-pass filter 41, phase demodulator 42, carrier NCO 43, and carrier frequency setting switcher 44. A correlated output signal from the pseudo distance measuring circuit 3 is input into the phase demodulator 42 via the band pass filter 41 to derive a phase of the received signal from the corresponding antenna 1A or 1B and a phase difference. It is noted that the orbit data modulator 4 further includes a carrier frequency code phase calculator 45.

Each channel CH1 and CH2 includes a reception control calculator 5 which transmits the PN code phase and a carrier frequency data to the PN code generator 32 within the pseudo distance measuring circuit 3 and to the carrier NCO within the orbit data demodulator 4.

Each channel CH1 and CH2 includes a position measurement and calculating block 6 having a microcomputer, deriving the position of the vehicle according to the result of measurement of the pseudo distance and deriving velocity and direction of each satellite according to Doppler frequency shift of the received signals of the respective antennae.

Numeral 7 denotes a display controller for displaying the position of the vehicle derived by the position measurement and calculation block together with a map.

Numeral 8 denotes a map memory for storing a data on the map and having a CD-ROM (Compact Disc Read Only Memory) and CD-ROM controller. Numeral 9 denotes a display of CRT.

Numeral 10 denotes a directional sensor including a geomagnetic sensor for detecting a geomagnetism and deriving a forward direction of the vehicle and a gyroscope (an optical gyroscope using a optical fiber) for detecting a relative change in the forward direction of the vehicle. Since the vehicle forward direction is determined according to the detection signal of the directional sensor 10, the directional sensor 10 includes a direction calculating circuit.

It is noted that the position measurement and calculation block serves to derive one of the satellites which is receivable from one of the antennae 1A and 1B on the basis of the derived position of the vehicle and orbit data on the GPS satellites and serves to select one of the satellites whose electromagnetic wave is to be received via one of the antennae 1A or 1B according to the derived arrangement of the satellites on their orbits. Then, the position measurement and calculation block 6 serves to select the satellites to be received from the respective antennae 1A and 1B.

It is noted that the structures and functions of the frequency converter 2, pseudo distance measuring circuit 3, orbit data demodulator 4, and reception control calculator 5 are exemplified by a Japanese Patent Application First Publication Showa 61-198072 published on Sep. 2, 1986, the disclosure of which is herein incorporated by reference.

Each GPS satellite (not shown) transmits a navigating signal on electromagnetic waves having two frequencies in order to correct errors generated when passing through an ionosphere. In this case, the navigating signal is usually subjected to a diffusion spectrum modulation by means of a pseudo noise signal (PN signal). Such a navigating signal is trapped by means of one or both of the GPS antennae 1A or 1B and transmitted to the frequency converter 2. The reference quartz oscillator 21 supplies a predetermined frequency signal to the multiplier 22 in which a local oscillation signal is obtained from a signal supplied from the reference quartz oscillator 21. The multiplier 22 supplies the local oscillation signal to the frequency converter (mixer 24). The received signal of the frequency converter 24 is frequency converted on the basis of the output signal of the multiplier 22. Then, the amplified signal of the amplifier 23 is supplied to the collator 31. The output of the PN code generator 28 generating the same code as the PN code of one of the satellites received by means of the code phase setting switcher 33 is supplied to the collator 31. The collator 31 takes the correlation between the output signal of the PN code generator 32 and the PN code of the amplified signal from the amplifier 23. That is to say, the received signal under the spectrum diffusion is subjected to a reverse diffusion with the output signal of the PN code generator 32 and subjected to the PN demodulation. The output signal of the collator 31 is introduced and filtered into the band pass filter 41. The output signal is introduced into the phase demodulator 42. The phase demodulator 42 detects the phase difference between the frequency signal supplied from the carrier NCO 43 under a switch setting action of the carrier frequency setting switcher 44, i.e., the same frequency as the received signal of the corresponding antenna 1A or 1B. The phase difference is introduced into the reception control calculator 5.

The reception control calculator 5 outputs it output signal to the code phase setting switcher 33 and carrier frequency setting switcher 44. The PN code phase and carrier frequency data are supplied to the PN code generator 32 and carrier NCO 43 respectively in response to the output signal from the reception control calculator 5. The collator 31, band pass filter 41, phase demodulator 42,, reception control calculator 5, code phase setting switcher 33, and PN code generator are integrally formed in a phase synchronization loop. On the other hand, the phase demodulator 42, reception control calculator 5, carrier frequency setting switcher 44, and carrier NCO 43 are integrally formed in a phase synchronization loop.

It is noted that in a case where the output signal of the phase demodulator 42 is introduced into the reception control calculator 5 and the reception control calculator 5 cannot detect the phase difference between the received frequency from the phase demodulator 42 and the frequency of the carrier NCO 43, the reception control calculator 5 and position measurement and calculation block 6 determine that it is impossible to measure the position of the vehicle. At this time, the position measurement/calculation block 6 refers to the output signal of the positional sensor 10.

As described above, the PN code generator 32 supplies the signal for PN demodulation to the collator 31. On the other hand, the code signal is supplied to the pseudo distance measuring instrument 34. The pseudo distance measuring instrument 34 can measure a pseudo distance to the one GPS satellite according to a phase value of the PN code generator 32 on the basis of the clock frequency generated from the reference quartz oscillator 21 and signal of the PN code. The measured pseudo distance is introduced into the position measurement/calculation block 6.

On the other hand, the output line of the phase demodulator 42 is branched into the input terminal of the position measurement/calculation block 6. The operation of the position measurement/calculation block 6 and carrier frequency code phase calculator 45 will be described later. The display controller 7 receives the output signal of the position measurement/calculation block 6 so that the position and forward direction of the vehicle are displayed on a map from the map memory 8 through the display unit 9.

It is also noted that the circuit construction of the GPS navigating apparatus is also exemplified by European Patent Application Publication No. 0 166 300 A3 published on Jan. 2, 1986 and U.S. Pat. No. 4,445,118 issued on Apr. 24, 1984, the disclosure of which is also herein incorporated by reference.

An operation of the position measurement and calculation block 6 of the GPS navigating apparatus will be described with reference to FIG. 6.

Figure 6:
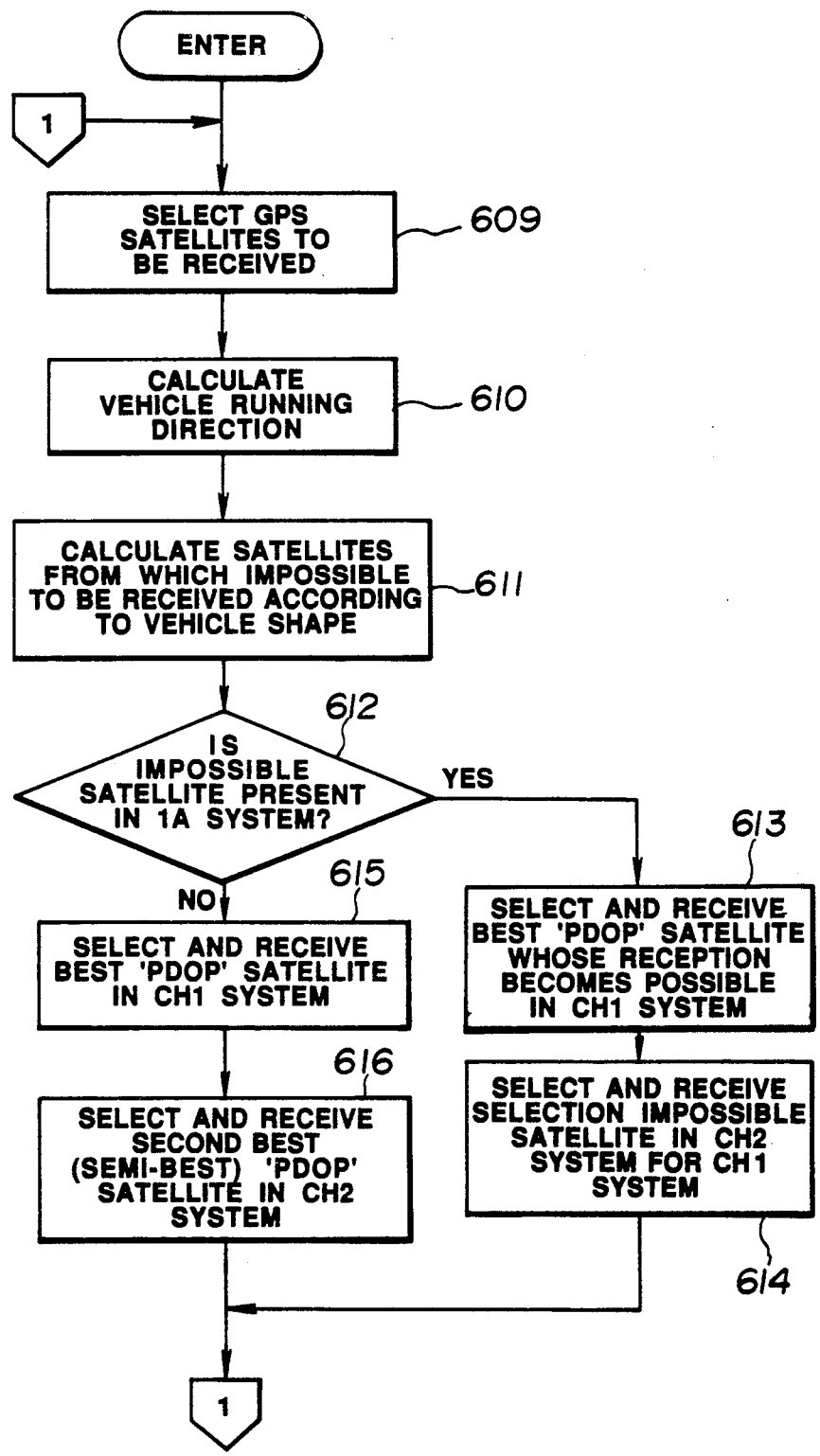
FIG. 6 is an operational flowchart for explaining operation of the GPS navigating apparatus shown in FIG. 1.

A progran shown in FIG. 6 is started upon turning on of a power supply of the GPS navigating apparatus.

In a step 609, a CPU of the microcomputer in the position measurement/calculation block 6 selects an optimum satellite to be used to derive the present vehicle position by selecting the satellite which provides, e.g., a mininum value of PDOP (Pseudo Dilution Of Precision).

In a step 610, the CPU calculates the forward direction of the vehicle on the basis of a signal from the geomagnetic sensor or gyroscope.

In a step 611, the CPU calculates the satellites from which electromagnetic waves cannot be received considering the shape of the vehicle and installed position of the two antennae 1A and 1B.

That is to say, GPS electromagnetic waves have strong linearity at about 1.5 GHz and cannot be received should the antenna be positioned in a shadow of the vehicle roof, for example. In the first preferred embodiment, the vehicle shape, structure, and appearance are not changed. Since the antennae 1A and 1B are installed on the vehicle body as shown in FIGS. 2 through 5. positional situations arise in which electromagnetic waves from a particular satellite (or satellites), cannot be received.

Figure 7:
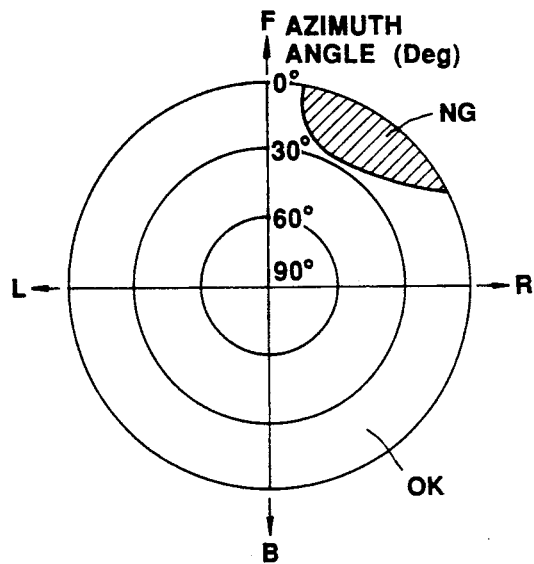
FIGS. 7 and 8 are explanatory views of possible receive areas and receive not possible areas for the GPS antennae, relative to sky coordinates.
Figure 8:
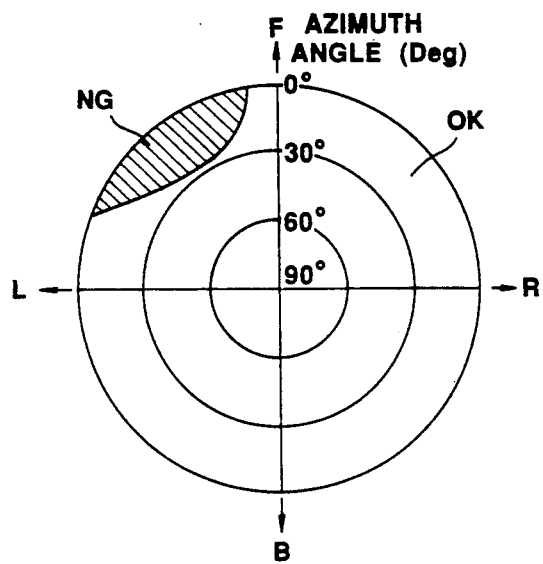

For example, as shown in FIG. 2, in a case wherein both antennae 1A and 1B are installed on both sides of the right and left sides of the trunk lid, satellite positions from which electromagnetic waves cannot be received are shown as NG in FIGS. 7 and 8.

That is to say, in FIGS. 7 and 8, suppose that R denotes the direction of the right side of the vehicle, L denotes the direction of the left side of the vehicle, F denotes the direction of the left side of the vehicle, F denotes the direction of the front of the vehicle and B denotes the direction of the rear of the vehicle.

From a sky area of the satellites viewable from the first and second antennae 1A and 1B, the CPU derives an oblique portion are a NG from which electromagnetic waves cannot be received and an area OK from which electromagnetic waves can be received.

In a step 611, the CPU derives which satellites from which electromagnetic waves cannot be received from the present arrangement of the satellites or orbits.

Figure 9:
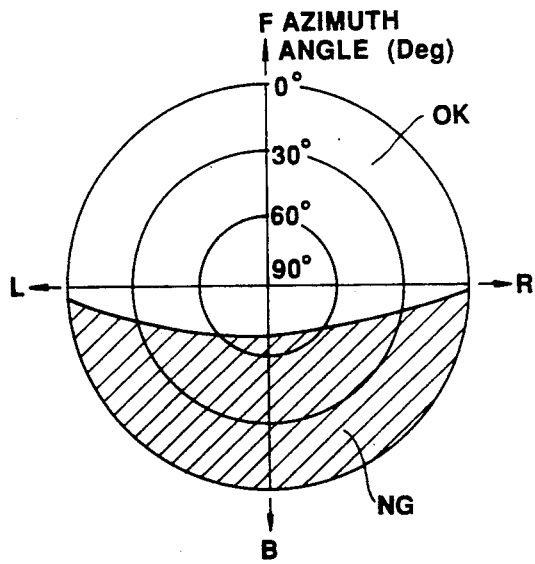
FIGS. 9 and 10 are explanatory views of the possible areas for the GPS antennae shown in FIGS. 3 through 5.
Figure 10:
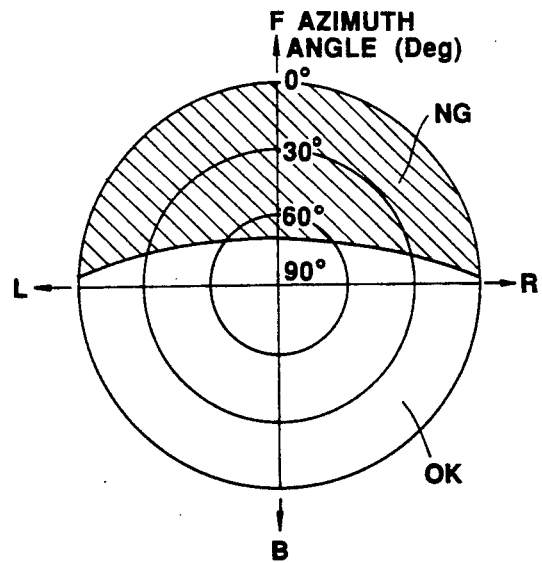

Various positioning examples are shown, FIG. 3 in which both GPS antennae 1A and 1B are incorporated in the front windshield and rear windshield, of FIG. 4 in which both GPS antennae 1A and 1B are arranged on the upper surface of the instrument panel and rear parcel shelf, and of FIG. 5 in which both GPS antennae are arranged on a bonnet and trunk lid center portion. In the embodiment of FIG. 5, the electromagnetic wave receivable OK area and the electromagnetic wave receive not possible NG area are roughly shown in FIGS. 9 and 10.

In a step 612, the CPU determines whether there is a satellite from which electromagnetic waves cannot be received by the channel CH1. If not (NO) in the step 612, the routine goes to a seap 615. If it is present (Yes) in the step 612, the routine goes to a step 613.

In the step 613, the CPU excludes satellites from which receipt of electromagnetic waves becomes impossible from among the satellites selected at the step 609 and selects and receive the satellite which has the best PDOP from among the receivable satellites.

In a step 614, satellite from which electromagnetic waves cannot be received on channel CH1 is selected to be received on channel CH2.

On the other hand, in step 615, the satellite which the best PDOP is selected and received on channel CH2 to assist channel CH1.

In the preferred embodiment, since the channel CH1 concerned with the antenna 1A is a main receiver with electromagnetic waves of the satellites which belong to the CH1 reception impossible area NG being received by the channel CH2 2, in all receivable states the channel CH2 is auxiliary used. No problems in selecting the receive satellite, as in a diversity method, occurs and speedy calculation of the present position of the vehicle can be achieved.

Furthermore, since the pair of GPS antennae 1A and 1B are compactly installed on front and rear ends or left and right side of the vehicle body in a form so as not to disturb vehicle operation, as shown in FIGS. 2 through 5, the GPS antennae do not worsen the design of the vehicle body and do not affect drivin safety. Therefore, according to the present invention, cost-reduced and general purpose vehicles employing GPS navigating can be achieved.

It will fully be appreciated by those skilled in the ar that the foregoing description has been made in terms of the preferred embodiments and various changes and modifications may be made without departing from the scope of the present invention which is to be defined by the appended claims.

What is claimed is:

1. A GPS navigating apparatus for a movable object, comprising:
   a) a plurality of GPS antennae installed at positions other than the roof top of the movable object in which the GPS navigating apparatus is mounted;
   b) first means for deriving a forward direction of the movable object;
   c) second means for selecting any of a plurality of satellites from which each GPS antenna can receive electromagnetic waves on the basis of orbit data of the respective satellites, mounting positions of the GPS antennae, and forward direction of the movable object; and
   d) third means for selecting any of the satellites required to calculate a present position of the movable object from among the satellites from which the GPS antennae can receive the electromagnetic waves.

2. A GPS navigating apparatus as set forth in claim 1, which further comprises fourth means for calculating a present position of the movable object on the basis of electromagnetic waves received by the GPS antennae from the number of satellites selected by said third means.

3. A vehicular GPS navigating apparatus comprising:
   a) a plurality of GPS antennae installed at positions other than a roof top of the movable object in which the GPS navigating apparatus is mounted;
   b) first means for deriving a forward direction of the movable object;
   c) second means for selecting any of a plurality of satellites from which each GPS antenna enables reception of electromagnetic waves on the basis of orbit data of the respective satellites, mounting positions of the GPS antennae, and forward direction of the movable object; and
   d) third means for selecting any of the satellites required to calculate a present position of the movable object from among the satellites from which the GPS antennae enable reception of the electromagnetic waves.

4. A vehicular GPS navigating apparatus as set forth in claim 3, which further comprises fourth means for deriving any of the satellites selected by the third means from which said electromagnetic waves cannot be received by said GPS antennae and fifth means for determining whether there is at least one of the satellites from which the corresponding electromagnetic waves cannot be received by one of said GPS antennae.

5. A vehicular GPS navigating apparatus as set forth in claim 4, which further comprises fourth means for deriving any of the satellites selected by the third means from which said electromagnetic waves cannot be received by the GPS antennae and fifth means for determining whether there is at least one of the satellites from which the corresponding electromagnetic waves cannot be received by said one GPS antenna.

6. A vehicular GPS navigating apparatus as set forth in claim 5, which further includes eighth means for selecting and receiving electromagnetic waves derived from a satellite through another GPS antenna when electromagnetic waves cannot be received by said one GPS antenna.

7. A vehicular GPS navigating apparatus as set forth in claim 4, which further comprises ninth means for selecting and receiving a best PDOP satellite through the one GPS antenna when the fifth means determines that there is no satellite from which electromagnetic waves cannot be received by said one GPS antenna and tenth means for selecting and receving the electromagnetic waves from a second best PDOP satellite through another GPS antenna.

8. A vehicular GPS navigating apparatus as set forth in claim 7, wherein the GPS antennae are installed on both left and right sides of a trunk lid of a vehicle.

9. A vehicular GPS navigating apparatus as set forh in claim 7, wherein GPS antennae are incorporated into a front windshield and rear windshield of the vehicle.

10. A vehicular GPS navigating apparatus as set forth in claim 7, wherein the GPS antennae are installed on upper surfaces of an instrument panel and on a rear parcel shelf of a vehicle.

11. A vehicular GPS navigating apparatus as set forth in claim 7, wherein the GPS antennae are installed on center positions of the engine bonnet and trunk lid of a vehicle.

12. A vehicular GPS navigating apparatus as set forth in claim 3, wherein the first means includes a geomagnetic direction sensor which detects geomagnetism and derives the forward direction of the vehicle on the basis of detected geomagnetism.

13. A vehicular GPS navigating apparatus as set forth in claim 12, wherein the first means includes an optical gyroscope for deriving a turning angular speed of the vehicle and for detecting relative change in the forward direction of the vehicle.

14. A method of navigating a vehicle using GPS (Global Positioning System), comprising the steps of:
   a) providing a plurality of GPS antennae installed at positions other than the roof top of the movable object in which the GPS navigating apparatus is mounted;
   b) deriving a forward direction of the vehicle;
   c) selecting any of a plurality of GPS satellites from which each GPS antenna can receive electromagnetic waves on the basis of orbit data of the respective satellites, mounting positions of the GPS antennae, and forward direction of the vehicle; and
   d) selecting the satellites required to calculate a present position of the vehicle from among the satellites from which the GPS antennae can receive electromagnetic waves.

15. A method of navigating the vehicle using GPS as set forth in claim 14, which further comprises the step of calculating a present position of the vehicle on the basis of the electromagnetic waves received by the GPS antennae from the selected number of satellites in the step d).

* * * * *